UNITED STATES PATENT OFFICE.

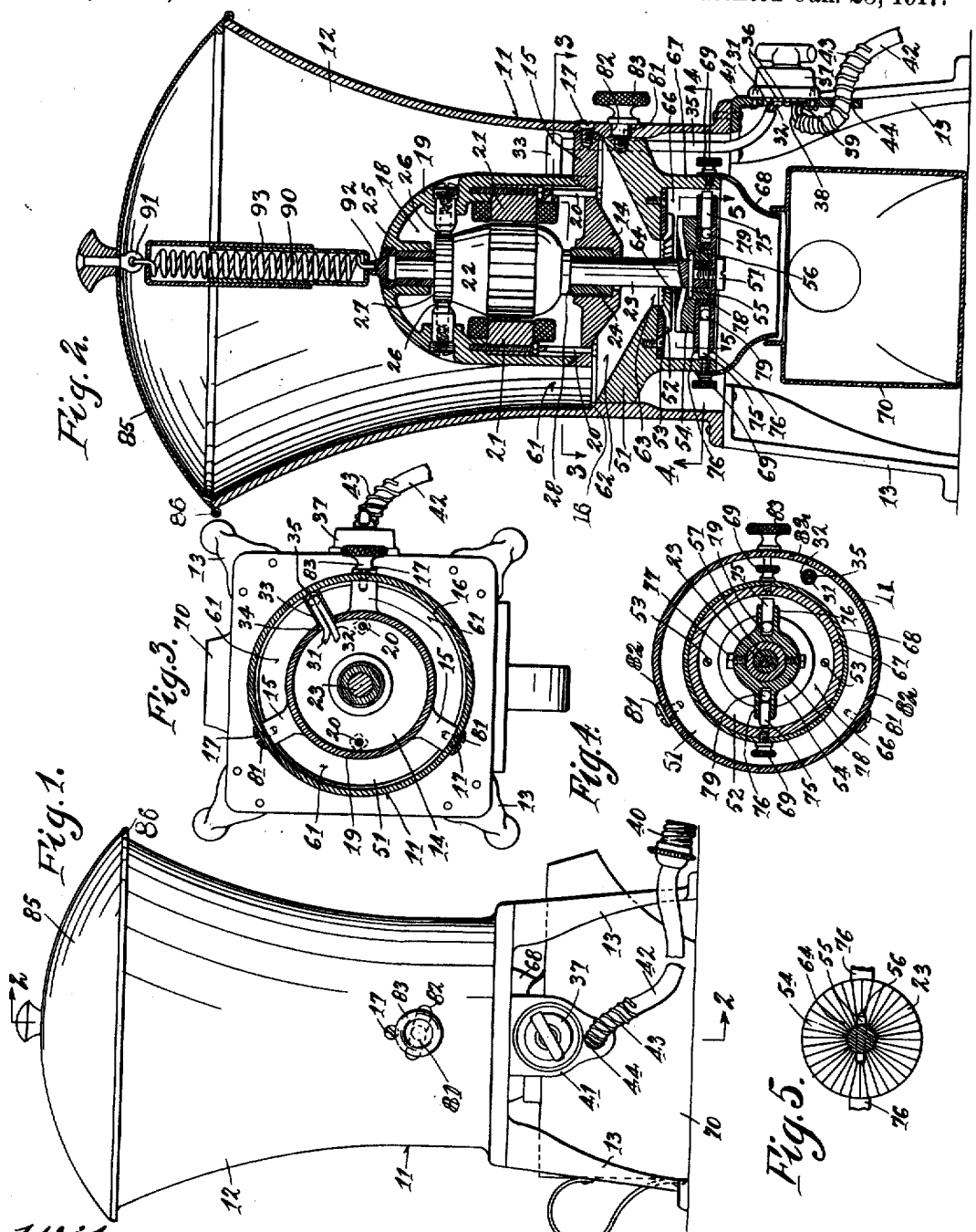

EDWARD J. BODEY, OF CINCINNATI, OHIO.

GRINDING-MACHINE.

1,213,149.  Specification of Letters Patent.  Patented Jan. 23, 1917.

Application filed November 29, 1915. Serial No. 64,012.

*To all whom it may concern:*

Be it known that I, EDWARD J. BODEY, a citizen of the United States, residing at Cincinnati, in the county of Hamilton and State of Ohio, have invented certain new and useful Improvements in Grinding-Machines, of which the following is a specification.

My invention relates to grinding machines, especially to so-called portable grinding machines for the grinding of coffee and the like at the time of sale to the retail customer, and which are usually placed upon the counter and intended to grind the coffee at the time of sale.

It is the object of my invention to provide a machine of the character mentioned, which is compact in construction and occupies little lateral space, so as to take up little of the surface space of the counter.

It is a further object of my invention to provide a grinding machine of the character mentioned, which has a grinding shaft extending up and down, and an electric motor mounted above the grinding burs; further to provide a grinding machine of the character mentioned comprising an electric motor located in the receiving hopper; further to provide a grinding machine of the character mentioned comprising grinding burs located within a lower cavity, the rotating bur having an upright shaft, and providing an automatic speed-limiting brake for the motor; and, further to provide a grinding machine of the character mentioned comprising an electric motor for driving the same, the receiving hopper and the feeding channels to the burs being located about the electric motor.

The invention will be further readily understood from the following description and claims, and from the drawings, in which latter:

Figure 1 is a side elevation of my improved device. Fig. 2 is a vertical axial section of the same, taken on the line 2—2 of Fig. 1. Fig. 3 is a plan section of the same taken on a line corresponding to the irregular line 3—3 of Fig. 2. Fig. 4 is a bottom view section of the same, taken on a line corresponding to the line 4—4 of Fig. 2; and, Fig. 5 is a detail in horizontal section on the line 5—5 of Fig. 2.

11 represents the frame of the machine, 
which is extended at its upper end in flaring manner to form a hopper 12. The frame is mounted on suitable legs 13, rigidly secured thereto. A member 14 is mounted in the frame, exemplified as a spider having wings 15 resting on an annular shoulder 16 at the inner face of the frame, and held rigidly to the frame by means of screws 17.

The member 14 forms a closed bottom for the motor casing of an electric motor 18 located in the hopper 12. The motor casing is represented as a closed casing. The hood 19 of the motor is fixed to the member 14 by means of bolts 20 which pass through holes in the fields 21 of the electric motor.

The armature 22 of the electric motor is fast on the upright shaft 23, which has a bearing 24 in the member 14 and a bearing 25 in the upper portion of the motor casing. The shaft-contacting portions of these bearings may be of arguta or other anti-friction wood or other material, so as to avoid the necessity of oiling the bearings. Brushes 26 coact with the commutator 27 on the shaft. A step-bearing for the upright shaft is formed by the shoulder 28 thereon coacting with the bearing 24.

Electric conducting wires 31, 32, are suitably connected with the brushes and fields of the motor in usual manner. These electric conductors pass through a tube 33 secured, as by a threaded connection 34, to the motor-casing, and having a flexible tube 35 extending therefrom. The electric conductors pass through said flexible tube and releasably connect with suitable binding posts 36 on an electric switch 37, from which flexible electric conductors 38, 39, pass to a suitable electric plug 40, with which connection may be made with any ordinary electric light socket.

The electric switch is suitably secured to an apron 41 extending from the frame of the machine. The flexible electric conductors 38, 39, are received through a suitable flexible tube 42 which may be surrounded by a suitable spring 43 passing through a hole 44 in the apron adjacent to the switch, arranged to sustain the flexible tube so as to prevent kinking of the same and parting of the electric conductors.

The hopper bottom 51 is preferably a casting which has an upper bur 52 thereon, this upper bur being instanced on a separate plate rigidly secured to the hopper bottom by screws 53, the plate being preferably of hardened steel. A lower bur 54, of hardened steel, is rigidly secured to the upright shaft, which may be accomplished by providing the upright shaft with a cross-pin 55 arranged to be received in a slot 56 in the lower bur, the lower bur being held with its slot about the pin by means of a lower screw 57.

The coffee or other material to be ground is placed in the hopper about the motor-casing and passes through the passages 61 between the bottom of the motor-casing and the side walls of the hopper, and through the space 62 between the bottom of the motor-casing and the hopper bottom, this latter space being preferably an annular space slanting downwardly toward the upright shaft and communicating with the opening 63 in the upper bur, the lower bur being preferably provided with a hollow 64 adjacent to the upright shaft into which the coffee or material being ground is received.

When the motor rotates, the lower bur causes the coffee or other material to be ground between the teeth of the respective burs and at the same time causes the ground material to be ejected laterally by centrifugal force.

In order that the ground material may not unduly scatter, I mount the burs in a cavity 66, formed by the depending annular wall 67 extending from the support of the upper bur, the material passing through this cavity, preferably into a funnel 68, suitably secured to the wall 67, as by thumb-screws 69. The funnel 68 communicates with a suitable can 70 removably received in the space under the legs of the machine.

The electric motor is preferably a high speed motor. In order to control the speed of the motor I provide a speed-control, in the present instance, a friction-control comprising brake-shoes 75 which may be of wood, slidable longitudinally in thimbles 76, secured so as to rotate with the upright shaft, accomplished in the present instance by means of set-screws 77 threaded into the hub of the thimble-carrier 78 and engaging the hub of the lower bur, the screw 57 passing through the web of the thimble-carrier.

If desired, the brake-shoes may be backed by metal balls 79 for aiding in the force of frictional resistance applied by the brakes.

The brake-shoes rotate rapidly with the lower bur. While the lower bur is rotating within the limit of determined safety, there is either no frictional contact or but slight frictional contact between the shoes and the surrounding annular wall 67. If, however, the speed of the armature of the electric motor reaches what has been determined to be the safe limit of speed of rotation, the shoes will be forced outwardly by the centrifugal force, so as to frictionally engage the annular surrounding wall to maintain the speed of rotation of the armature within the desired limit. The brake-shoes, if made of wood, preferably have the ends of the grain of wood presented to the surrounding braking surface.

In order to control the fineness or coarseness of the grinding, I prefer to adjust the upper bur, which is accomplished, in the present exemplification, by providing the upper bur with projections 81 received in inclined slots 82 in the wall of the frame, a relative rotation between the walls of the inclined slots and the projections causing a raising or lowering of the upper bur. In the present instance the pins are in the form of screws, one of them taking the form of a thumb-screw 83, the screws having threaded connections with the support for the upper bur. If it is desired to change the distance between the burs, the thumb-screw is slightly unscrewed and employed to turn the support of the upper bur, so as to move the pins lengthwise of the slots. When the proper separation between the burs has been attained the thumb-screw is again tightened, whereby the support for the upper bur is again fixed rigidly in place by the clamping of the thumb-screw.

The hopper is provided with a cover 85, the cover being provided with an annular flange 86. I prefer that the cover shall be adjustably held to the machine proper so as to avoid misplacing and to provide ready shifting of the cover to open the same for receiving the material and to close the same after the material is received. Thus I provide a spring 90 extending between a lug 91 of the cover and a lug 92 at the upper end of the motor-casing, the spring being surrounded by a telescoping tube 93 in order to separate the spring from the material to be ground. The outer ends of the sections of the telescoping tube are preferably held between the ends of the spring and the respective lugs 91, 92. The arrangement is such that a continuous pulling force is applied to the cover for maintaining the same upon the hopper, and so that when the cover is closed the annular flange 82 may readily be urged into position with relation to the upper end of the hopper for properly seating the cover.

In my improved device the motor may be readily removed by the removal of the screws 17, 57, and release of the flexible connections from the binding-posts 36, and the burs may be readily removed with the motor by the additional removal of the screws 81.

Having thus fully described my invention, what I claim as new and desire to secure by Letters Patent, is:

1. In a grinding machine of the character described, the combination of horizontally disposed burs, a grinding shaft extending up and down and having operative connection with one of said burs, a feeding hopper, and an electric motor having operative connection with said grinding shaft, said electric motor received by said hopper.

2. In a grinding machine of the character described, the combination of an upright shaft, a feeding hopper comprising a hopper bottom, an electric motor located within said feeding hopper above said hopper bottom, said hopper bottom having a feed-opening through which said upright shaft extends, and a pair of horizontally disposed burs located below said feed-opening, one of said horizontally disposed burs having operative connection with said upright shaft for rotating the same.

3. In a grinding machine of the character described the combination of a hopper comprising a hopper bottom, an electric motor received by said hopper above said hopper bottom, said electric motor comprising an armature-shaft, said hopper bottom having a feed-opening through which said shaft extends, horizontally disposed burs one of which has operative connection with said shaft for rotating the same, an annular wall having a braking surface about said armature-shaft, and centrifugally acting brake-shoes having operative connection with said shaft for being rotated thereby and movable substantially horizontally for coacting with said braking surface.

4. In a grinding machine of the character described, the combination of a frame, a hopper extending upwardly therefrom, a grinding-bur, a coacting grinding-bur, and an electric motor mounted in said hopper and having an armature-shaft extending through said first-named bur and operatively connected with said coacting bur, said first-named bur having a support, and said support and said frame having inclined slot and radially extending pin connections between them, whereby upon relative rotative movement between the walls of said slots and said radially extending pins said bur-support is adjusted lengthwise of said shaft.

5. In a grinding machine of the character described, the combination of a frame, a hopper extending upwardly therefrom, a pair of horizontally disposed grinding-burs, an electric motor thereabove comprising an armature-shaft to which one of said burs is secured, said electric motor received into said hopper from above, securing means between said electric motor and said hopper, said last-named bur and said armature-shaft having a connection therebetween releasable by a movement of said bur downwardly lengthwise of said shaft, and said electric motor movable lengthwise in the opposite direction out of said hopper.

6. In a grinding machine of the character described, the combination of a frame, a hopper extending upwardly therefrom, a hopper bottom received in said frame and having a grinding-bur thereunder, an electric motor received from above in said hopper above said hopper bottom, said motor comprising an armature-shaft extending through said hopper bottom and said grinding-bur, a coacting grinding-bur secured to said armature-shaft, with said first-named grinding-bur located between said hopper-bottom and said coacting grinding-bur, and releasable connections between said electric motor and hopper and between said hopper bottom and frame, whereby said electric motor, hopper-bottom and burs may be removed by lengthwise movement thereof from said frame and through said hopper.

7. In a grinding machine of the character described, the combination of a hopper, a hopper bottom, an annular wall depending from said hopper bottom, a pair of horizontally disposed grinding-burs located in the cavity of said annular wall, said annular wall comprising an annular braking surface, an upright rotatable shaft, an electric motor for driving the same, one of said grinding-burs operatively connected with said rotatable shaft for rotating the same, and centrifugally acting friction brake-shoes rotating in a substantially horizontal plane with said rotatable grinding-bur and coacting with said braking surface.

8. In a grinding machine of the character described, the combination of a frame, a hopper provided with an inner shoulder, an electric motor in said hopper having an end-member seated on said shoulder, releasable securing means between said hopper and said end-member, there being a feed-passage for the material to be ground between said electric motor and hopper through said end-member, said electric motor comprising an armature-shaft, a hopper bottom having a grinding-bur thereon, and a coacting grinding-bur having operative connection with said armature-shaft, said hopper-bottom and frame having adjustable connection between them for adjusting said first-named bur with relation to said second-named bur, said frame having an open end opening oppositely to the seating surface of said shoulder, and said adjusting connection being releasable for releasing said hopper bottom through said open end from the inside of said frame.

9. In a grinding machine of the character described, the combination of a feeding hopper, grinding-burs, an electric motor located within said hopper for said grinding-burs, a cover for said hopper, and a spring resiliently holding said cover toward the top of said hopper extending between the upper end of said electric motor and said cover.

10. In a grinding machine of the character described, the combination of a hopper, grinding-burs, an electric motor located within said hopper for said grinding-burs, a cover for said hopper, a spring resiliently holding said cover toward the top of said hopper extending between the upper end of said electric motor and said cover, and a telescoping tube between said cover and electric motor surrounding said spring.

In testimony whereof, I have hereunto signed my name in the presence of two subscribing witnesses.

EDWARD J. BODEY.

Witnesses.
 THERESA M. SILBER,
 CONSTANT SOUTHWORTH.

Copies of this patent may be obtained for five cents each, by addressing the "Commissioner of Patents, Washington, D. C."